(12) United States Patent  
Yamazaki

(10) Patent No.: US 9,389,444 B2
(45) Date of Patent: Jul. 12, 2016

(54) ELECTRO-OPTICAL APPARATUS AND ELECTRONIC EQUIPMENT

(71) Applicant: SEIKO EPSON CORPORATION, Tokyo (JP)

(72) Inventor: Tetsuro Yamazaki, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/565,203

(22) Filed: Dec. 9, 2014

(65) Prior Publication Data
US 2015/0170588 A1    Jun. 18, 2015

(30) Foreign Application Priority Data

Dec. 18, 2013  (JP) ................. 2013-260960

(51) Int. Cl.
*G09G 5/00* (2006.01)
*G02F 1/133* (2006.01)
*G02F 1/1362* (2006.01)
*G09G 3/36* (2006.01)

(52) U.S. Cl.
CPC ........ *G02F 1/13306* (2013.01); *G02F 1/13624* (2013.01); *G09G 3/3614* (2013.01); *G09G 3/3659* (2013.01); *G09G 2300/023* (2013.01); *G09G 2320/0233* (2013.01)

(58) Field of Classification Search
CPC . G09G 3/3611; G09G 3/3614; G09G 3/3655; G09G 3/3659; G09G 2330/021; G02F 1/133; G02F 1/13624; G02F 1/136245
See application file for complete search history.

(56) References Cited

U.S. PATENT DOCUMENTS

| 7,265,742 | B2 | 9/2007 | Iisaka | |
| 2005/0052385 | A1 | 3/2005 | Noda | |
| 2005/0151830 | A1* | 7/2005 | Yamazaki | H01L 27/322 347/238 |
| 2005/0190172 | A1 | 9/2005 | Koyama | |
| 2006/0208984 | A1* | 9/2006 | Kim | G09G 3/3648 345/90 |
| 2007/0001960 | A1* | 1/2007 | Kim | G09G 3/3677 345/92 |
| 2008/0123026 | A1* | 5/2008 | Kwag | G02F 1/133555 349/77 |
| 2010/0103085 | A1* | 4/2010 | Lee | G02F 1/134363 345/92 |
| 2011/0043498 | A1* | 2/2011 | Tsubata | G02F 1/13624 345/204 |
| 2011/0073868 | A1* | 3/2011 | Nakagawa | H01L 27/1214 257/72 |
| 2011/0187759 | A1 | 8/2011 | Sasaki et al. | |
| 2011/0221789 | A1* | 9/2011 | Ota | H01L 27/3267 345/690 |
| 2012/0194763 | A1* | 8/2012 | Cheong | G02F 1/133555 349/62 |
| 2013/0069993 | A1* | 3/2013 | Nishimori | G09G 3/003 345/690 |
| 2014/0055503 | A1* | 2/2014 | Jung | G09G 5/10 345/690 |
| 2015/0070336 | A1* | 3/2015 | Qu | G09G 3/3648 345/206 |

FOREIGN PATENT DOCUMENTS

| JP | 06-208138 | A | 7/1994 |
| JP | 07-104246 | A | 4/1995 |
| JP | 2002-207184 | A | 7/2002 |
| JP | 2004-177930 | A | 6/2004 |
| JP | 2005-062396 | A | 3/2005 |
| JP | 2005-221569 | A | 8/2005 |
| JP | 2010-102151 | A | 5/2010 |
| JP | 2011-158776 | A | 8/2011 |

* cited by examiner

*Primary Examiner* — Joe H Cheng
(74) *Attorney, Agent, or Firm* — Maschoff Brennan

(57) ABSTRACT

An electro-optical apparatus is provided with a pixel where first scanning line, first signal line, second scanning line, and second signal line are wired. The pixel includes a first transistor, a second transistor, a first pixel electrode, a second pixel electrode, and an electro-optical material, and the electro-optical material is interposed between the first pixel electrode and the second pixel electrode.

7 Claims, 5 Drawing Sheets

ELECTRO-OPTICAL APPARATUS AND ELECTRONIC EQUIPMENT

This application is claimed the foreign priority of Japanese Patent Application No. 2013-260960, filed Dec. 18, 2013, and the entire disclosure is expressly incorporated by reference herein.

BACKGROUND

1. Technical Field

The present invention relates to an electro-optical apparatus and electronic equipment.

2. Related Art

In electronic equipment with a display function, transmissive type electro-optical apparatuses and reflective type electro-optical apparatuses are used. These electro-optical apparatuses is irradiated with light and the transmitted light or the reflected light which is modulated by the electro-optical apparatus forms a display image, or is projected onto a screen to form a projected image. Liquid crystal apparatuses are known as the electro-optical apparatuses which are used in this kind of electronic equipment and these apparatuses form images using the dielectric anisotropy of the liquid crystal and the optical rotation property of light in the liquid crystal layer. An element substrate and a counter substrate are used in the liquid crystal apparatuses, scanning lines and signal lines are arranged on the element substrate which corresponds to an image display region, and pixels are arranged in the form of a matrix at the intersections thereof. Pixel transistors are provided in the pixels and an image signal is supplied to a pixel electrode of each of the pixels via the pixel transistor as a pixel potential. On the other hand, a common electrode is provided on the counter substrate and an image is formed according to the potential difference between the common electrode and the pixel electrodes.

In order to decrease the driving voltage in the liquid crystal apparatus, common potential inversion driving which sets the common potential which is supplied to the common electrode to an alternating potential is known. In general, the cycle of the common potential inversion driving is set to a frame period. On the other hand, polarity inversion driving is necessary in order to preserve the durability of the liquid crystal material in the liquid crystal apparatus. In polarity inversion driving, frame inversion driving which inverts the polarity for every frame, 1H inversion driving which inverts the polarity for every horizontal scanning period, dot inversion driving which inverts the polarity for every pixel, and the like, are known. When common potential inversion driving and 1H inversion driving, or common potential inversion driving and dot inversion driving are executed at the same time, since the pixel potential changes in the capacitive coupling along with the changes in the common potential, the driving voltage is actually increased rather than being decreased. For example, JP-A-2010-102151 describes a method for solving this problem. In JP-A-2010-102151, the common potential is changed after resetting the pixel potential and the common potential to the same potential.

In addition, region scanning is known as a driving method for a liquid crystal apparatus. As shown in JP-A-2004-177930, region scanning is a driving method where a plurality of sub-field regions are used in order to display one image (an image of one frame) and the sub-field regions move inside the display region. When this driving method is used, time-split gradation expression and the like are possible for polarity inversion driving and digital driving.

However, in the electro-optical apparatus which is described in JP-A-2010-102151, since the pixel potential and the common potential are the same potential, although for a short period, the contrast ratio is decreased and there are difficulties in practical use. In addition, even with a combination of region scanning and common potential inversion driving, decreasing the driving voltage (lowering the voltage) is difficult for the same reasons as above, that is, the capacitive coupling. In other words, there is a problem in the electro-optical apparatuses of the related art in that it is difficult to achieve both lower voltage and improved durability, both lower voltage and region scanning, or the like. Furthermore, there is a problem in the electro-optical apparatuses of the related art in that displaying high quality images with excellent uniformity in a display region is difficult.

SUMMARY

The invention can be realized in the following forms or application examples.

Application Example 1

According to this application example, there is provided an electro-optical apparatus including a plurality of pixels where first scanning lines, first signal lines, second scanning lines, and second signal lines are wired, in which the pixels include a first transistor, a second transistor, a first pixel electrode, a second pixel electrode, and an electro-optical material, the electro-optical material is interposed between the first pixel electrode and the second pixel electrode, a gate of the first transistor is electrically connected with the first scanning lines, one of a source or a drain of the first transistor is electrically connected with the first signal lines, and the other of the source or drain of the first transistor is electrically connected with the first pixel electrode, and a gate of the second transistor is electrically connected with the second scanning lines, one of a source or a drain of the second transistor is electrically connected with the second signal lines, and the other of the source or drain of the second transistor is electrically connected with the second pixel electrode.

According to this configuration, it is possible to easily set the optimum potential which is suited to the display of the electro-optical apparatus for each of the pixels. Accordingly, a high quality image with excellent uniformity is displayed in a display region and it is possible to realize both lower voltage and improved durability, both lower voltage and region scanning, or the like.

Application Example 2

The electro-optical apparatus according to Application Example 1 may further include a first substrate, and a second substrate, in which the first scanning lines, the first signal lines, the first transistor, and the first pixel electrode may be formed on the first substrate, and the second scanning lines, the second signal lines, the second transistor, and the second pixel electrode may be formed on the second substrate.

According to this configuration, it is possible to easily realize an electro-optical apparatus which displays high quality images with excellent uniformity and which is excellent in durability with a low power consumption, or an electro-optical apparatus which displays high quality images with excellent uniformity and for which region scanning is possible with a low power consumption.

Application Example 3

The electro-optical apparatus according to Application Example 1 or 2 may further include a driving section, in which the driving section may supply a first image signal to the first pixel electrode and may supply a second image signal to the second pixel electrode.

According to this configuration, since the electro-optical material is driven by the first image signal and the second image signal, it is possible to easily realize an electro-optical apparatus which displays high quality images with excellent uniformity and which is excellent in durability with a low power consumption, or an electro-optical apparatus which displays high quality images with excellent uniformity and for which region scanning is possible with a low power consumption.

Application Example 4

In the electro-optical apparatus according to Application Example 3, in a first period, the first image signal may have a potential (image potential) which corresponds to a display luminance and the second image signal may have a reference potential which is a lower potential than the image potential, and in a second period following the first period, the first image signal may have the reference potential and the second image signal may have the image potential.

According to this configuration, a driving potential such as an image potential is comparatively lowered and it is possible to invert the polarity to the electro-optical material in the first period and the second period.

Application Example 5

In the electro-optical apparatus according to Application Example 4, the first period and the second period may be alternately repeated.

According to this configuration, it is possible to realize polarity inversion driving with a low voltage.

Application Example 6

In the electro-optical apparatus according to Application Example 4 or 5, the driving section may include a storage circuit, the reference potential may be a potential (a pixel reference potential) which is suitable for every pixel, the storage circuit may store the pixel reference potential, and the driving section may supply the pixel reference potential which corresponds to one pixel by reading out the pixel reference potential from the storage circuit when providing the reference potential to the one pixel.

According to this configuration, since the optimum pixel reference potential is set as the reference potential for every pixel, it is possible to easily realize an electro-optical apparatus which displays a high quality image with excellent uniformity.

Application Example 7

According to this application example, there is provided electronic equipment including the electro-optical apparatus according to any one of Application Examples 1 to 6.

According to this configuration, it is possible to easily realize electronic equipment which is provided with an electro-optical apparatus which displays high quality images with excellent uniformity and which is excellent in durability with a low power consumption, or an electro-optical apparatus which displays high quality images with excellent uniformity and for which region scanning is possible with a low power consumption.

BRIEF DESCRIPTION OF THE DRAWINGS

The invention will be described with reference to the accompanying drawings, wherein like numbers reference like elements.

DESCRIPTION OF EXEMPLARY EMBODIMENTS

Description will be given below of embodiments of the invention with reference to the drawings. Here, in each of the following diagrams, the scale of each of the layers and members is set to be different to the actual scale in order that each of the layers and members be set to a recognizable size.

Embodiment 1

Summary of the Electronic Equipment

Figure 1:
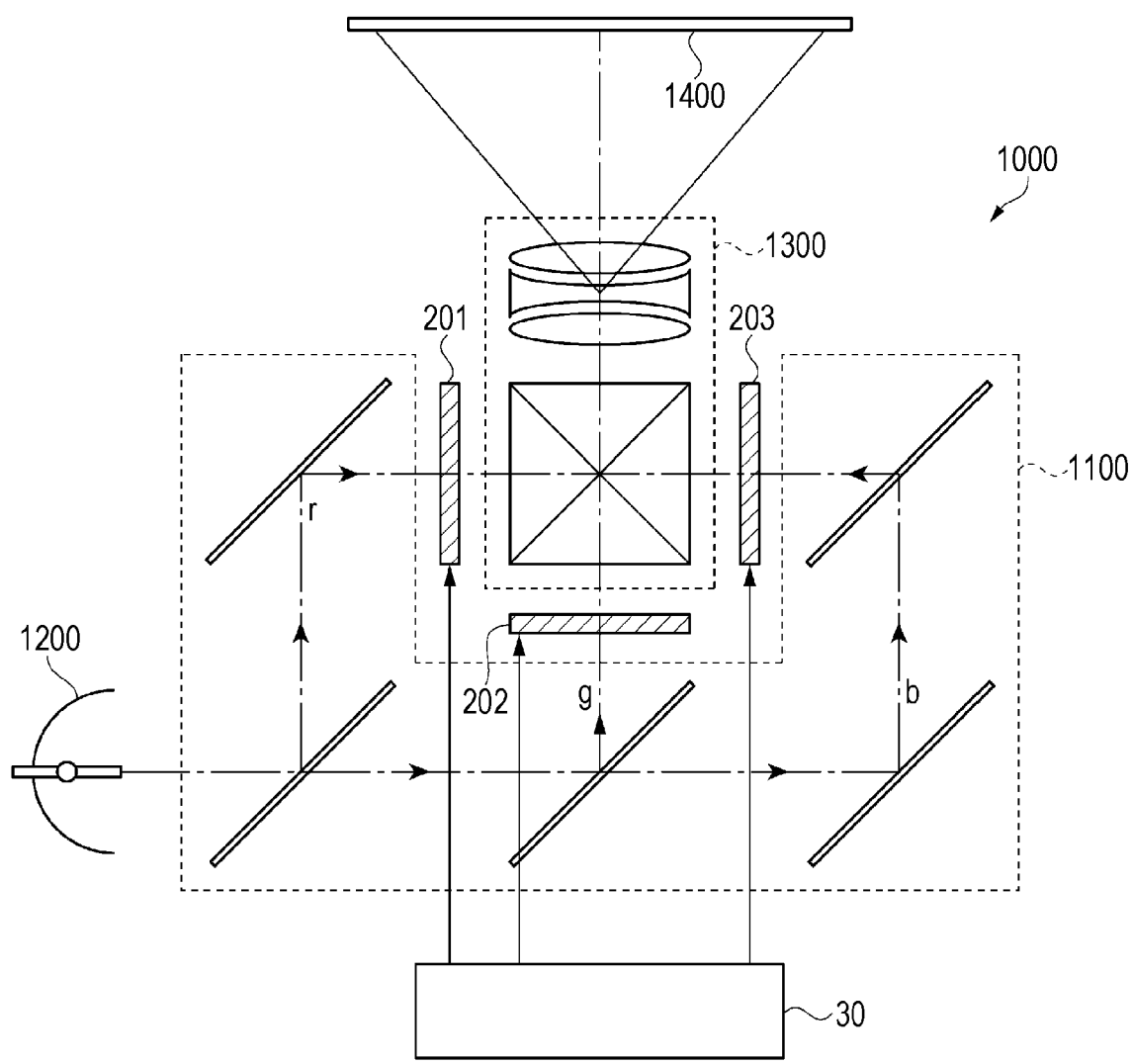
FIG. 1 is a schematic diagram of a projection type display apparatus which is an example of electronic equipment.

FIG. 1 is a schematic diagram of a projection type display apparatus (a three-plate projector) which is an example of the electronic equipment. Description will be given below of the configuration of the electronic equipment with reference to FIG. 1.

The electronic equipment (a projection type display apparatus 1000) has at least three electro-optical apparatuses 200 (with reference to FIG. 1, referred to below as a first panel 201, a second panel 202, and a third panel 203), and a control apparatus 30 which supplies a control signal to the electro-optical apparatuses 200. The first panel 201, the second panel 202, and the third panel 203 are three electro-optical apparatuses 200 which correspond to different display colors (red, green, and blue). Below, in particular, if it is not necessary to distinguish between the first panel 201, the second panel 202, and the third panel 203, these are collectively referred to simply as the electro-optical apparatus 200.

From out of the light emitted from an illumination apparatus (a light source) 1200, an illumination optical system 1100 supplies a red component r to the first panel 201, supplies a green component g to the second panel 202, and a blue component b to the third panel 203. Each of the electro-optical apparatuses 200 functions as a light modulator (a light valve) which modulates each of the colors of light, which are supplied from the illumination optical system 1100, according to the display image. A projection type optical system 1300 synthesizes and projects the light emitted from each of the electro-optical apparatuses 200 onto a projection surface 1400.

Summary of Electro-Optical Apparatus

Figure 2:
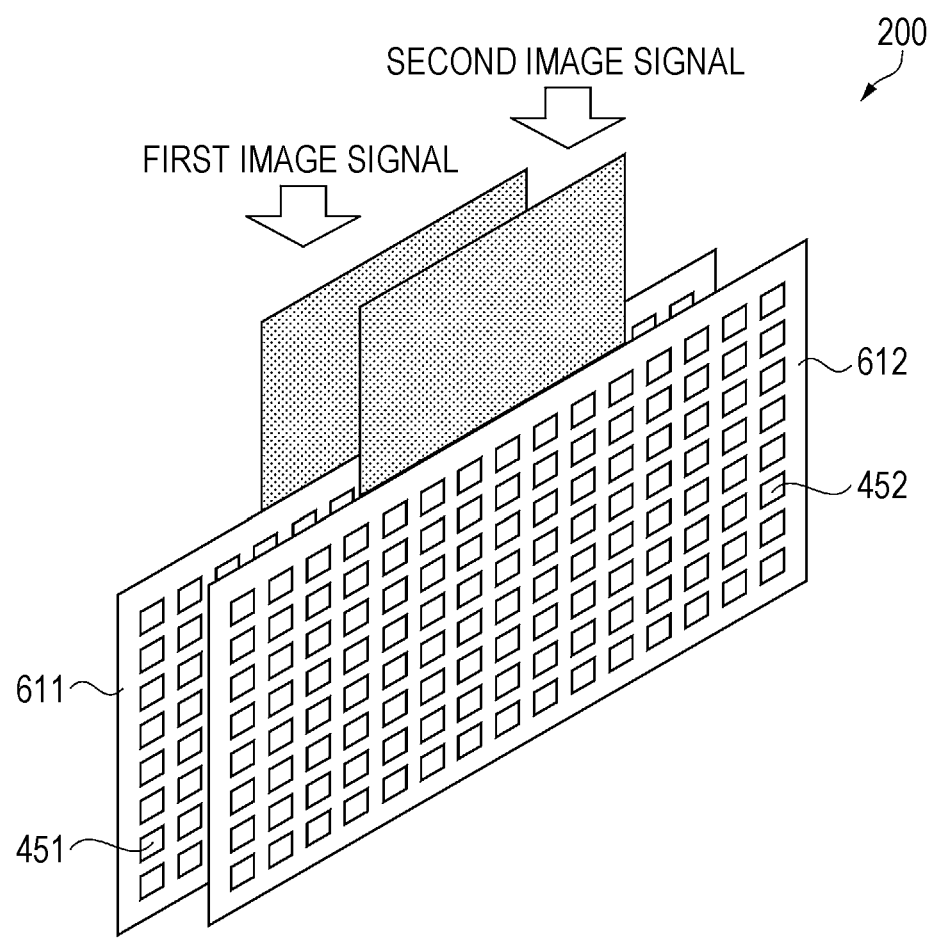
FIG. 2 is a diagram which illustrates a liquid crystal apparatus which is an example of an electro-optical apparatus.

FIG. 2 is a diagram which illustrates a liquid crystal apparatus which is an example of an electro-optical apparatus. Next, a summary of the electro-optical apparatus 200 will be given with reference to FIG. 2.

As shown in FIG. 2, the electro-optical apparatus 200 is provided with a first substrate 611 and a second substrate 612 and an electro-optical material which is not shown in the diagram is arranged between the first substrate 611 and the second substrate 612. In the present embodiment, the electro-optical material is a liquid crystal 46 (refer to FIG. 5). A plurality of pixels 41 (refer to FIG. 3) are arranged in the form of a matrix in the electro-optical apparatus 200 and each of the pixels 41 includes a first pixel electrode 451, a second pixel electrode 452, and an electro-optical material. Since the first pixel electrode 451 is formed on the first substrate 611 and the second pixel electrode 452 is formed on the second substrate 612, the electro-optical material in each of the pixels 41 is interposed between the first pixel electrode 451 and the second pixel electrode 452. The electro-optical apparatus 200 is further provided with a driving section 50 (refer to FIG. 3) and the driving section 50 supplies a first image signal to the first pixel electrode 451 and supplies a second image signal to the second pixel electrode 452. The first pixel electrode 451 and the second pixel electrode 452 in each of the pixels 41 are aligned such that the sizes and positions thereof are substantially matched when viewed from the normal direction of the first substrate 611 or the second substrate 612. As a result, the electro-optical material is driven according to a potential difference between the first image signal and the second image signal for every pixel 41 and the optical state is modulated in each of the pixels 41. In short, in the electro-optical apparatus 200, images are displayed according to the first image signal which is supplied to the first pixel electrode 451 and the second image signal which is supplied to the second pixel electrode 452.

Circuit Configuration of Electronic Equipment

Figure 3:
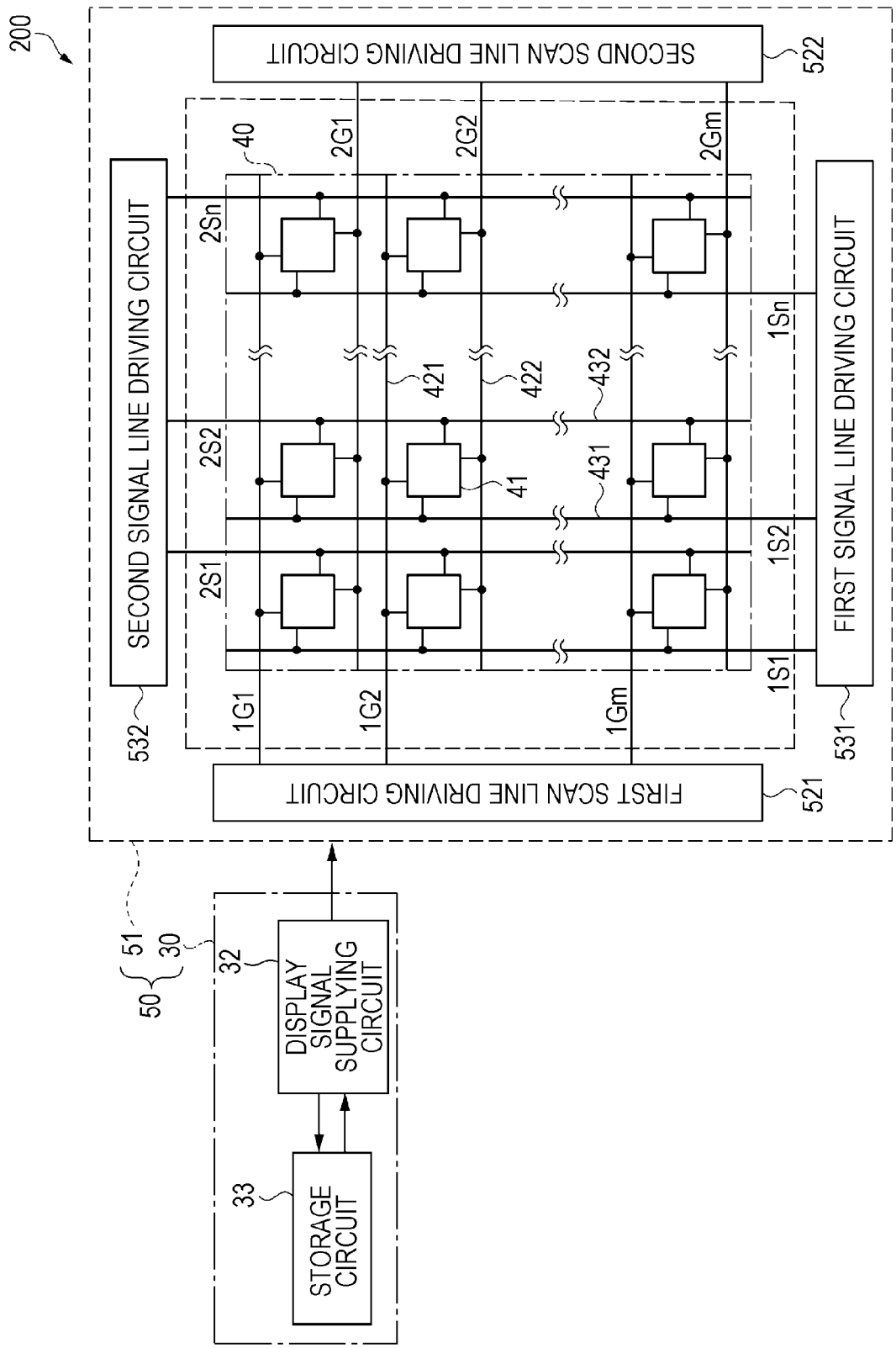
FIG. 3 is a circuit block diagram of the electro-optical apparatus.

FIG. 3 is a circuit block diagram of the electro-optical apparatus. Next, description will be given of a circuit block configuration of the electro-optical apparatus 200 with reference to FIG. 3.

As shown in FIG. 3, the electro-optical apparatus 200 is provided with at least a display region 40 and the driving section 50. In the display region 40 of the electro-optical apparatus 200, a plurality of first scanning lines 421 and a plurality of first signal lines 431 are formed to mutually intersect and the pixels 41 are arranged in the form of a matrix to correspond to each of the intersections between the first scanning lines 421 and the first signal lines 431. The first scanning lines 421 extend in the row direction and the first signal lines 431 extend in the column direction. In addition, in the display region 40 of the electro-optical apparatus 200, a plurality of second scanning lines 422 and a plurality of second signal lines 432 are formed to mutually intersect and the pixels 41 are arranged in the form of a matrix to correspond to each of the intersections between the second scanning lines 422 and the second signal lines 432. The second scanning lines 422 extend in the row direction and the second signal lines 432 extend in the column direction. Accordingly, the first scanning lines 421, the first signal lines 431, the second scanning lines 422, and the second signal lines 432 are wired in each of the pixels 41 which are arranged in the form of a matrix. In the present specification, the row direction is parallel to the X axis and the column direction is parallel to the Y axis. Here, when specifying the first scanning line 421 of the i-th row in the first scanning lines 421, this is written as the first scanning line 1Gi, and when specifying the first signal line 431 of the j-th column in the first signal lines 431, this is written as the first signal line 1Sj. In the same manner, when specifying the second scanning line 422 of the i-th row in the second scanning lines 422, this is written as the second scanning line 2Gi, and when specifying the second signal line 432 of the j-th column in the second signal lines 432, this is written as the second signal line 2Sj. In the display region 40, m of first scanning lines 421 and the second scanning lines 422 and n of the first signal lines 431 and the second signal lines 432 are formed (m is an integer of 2 or more and n is an integer of 2 or more). Here, in the present embodiment, description will be given of the electro-optical apparatus 200 in which m=2168 and n=4112 as an example. In such a case, with respect to the display region 40 with 2168 rows×4112 columns, a so-called 4K image of 2160 rows×4096 columns is displayed.

Various types of signals are supplied from the driving section 50 to the display region 40 and images are displayed on the display region 40. That is, the driving section 50 supplies driving signals to a plurality of the first scanning lines 421, a plurality of the first signal lines 431, a plurality of the second scanning lines 422, and a plurality of the second signal lines 432. Specifically, the driving section 50 is configured to include a driving circuit 51 which drives each of the pixels 41, a display signal supply circuit 32 which supplies a display signal to the driving circuit 51, and a storage circuit 33. The storage circuit 33 includes a temporary storage circuit which temporarily stores frame images, and a non-volatile storage circuit which stores the optimum reference potentials (pixel reference potentials) for every pixel 41 for a long period. The display signal supply circuit 32 creates a display signal from the frame images which are stored in the storage circuit 33 and supplies the created display signal to the driving circuit 51. The display signal is a potential (an image potential) which corresponds to the display luminance in each of the pixels 41, a reference potential which is a lower potential than the image potential, a clock signal, or the like.

The driving circuit 51 is configured to include a first scanning line driving circuit 521, a first signal line driving circuit 531, a second scanning line driving circuit 522, and a second signal line driving circuit 532. The first scanning line driving circuit 521 outputs scanning signals which select or unselect the pixels 41 in the row direction to each of the first scanning lines 421 and the second scanning line driving circuit 522 outputs scanning signals which select or unselect the pixels 41 in the row direction to each of the second scanning lines 422. The first scanning lines 421 and the second scanning lines 422 send these scanning signals to the pixels 41. In other words, the scanning signals have a selected state and an unselected state and it is possible for the first scanning lines 421 to be appropriately selected by receiving the scanning signal from the first scanning line driving circuit 521. In addition, it is possible for the second scanning lines 422 to be appropriately selected by receiving the scanning signal from the second scanning line driving circuit 522. The first scanning line driving circuit 521 and the second scanning line driving circuit 522 are provided with a shift register circuit which is not shown in the diagram and a signal which shifts the shift register circuit is output as a shift output signal for every stage. Scanning signals are formed using the shift output signal.

The first scanning line driving circuit 521 and the second scanning line driving circuit 522 are synchronized and the pixels 41 of the same row are always selected at the same time. For example, when the first scanning line driving circuit 521 selects the first scanning line 1Gi of the i-th row, the second scanning line driving circuit 522 also selects the second scanning line 2Gi of the i-th row. The first signal line driving circuit 531 supplies the first image signal to each of n of the first signal lines 431 in synchronization with the selection of the first scanning lines 421. In addition, the second signal line driving circuit 532 supplies the second image signal to each of n of the second signal lines 432 in synchronization with the selection of the second scanning lines 422.

The first signal line driving circuit 531 and the second signal line driving circuit 532 are also synchronized and the first image signal and the second image signal are always supplied with respect to the pixels 41 of the same row. For example, when the first signal line driving circuit 531 supplies the first image signal with respect to the first pixel electrode 451 of the pixels 41 of the i-th row, the second signal line driving circuit 532 also supplies the second image signal with respect to the second pixel electrode 452 of the pixels 41 of the i-th row.

A single display image is formed in one frame period. Each of the first scanning lines 421 and each of the second scanning lines 422 are selected at least once in one frame period. Usually, each of the first scanning lines 421 and each of the second scanning lines 422 are selected once, respectively. Since a period where one row of pixels 41 is selected is referred to as a horizontal scanning period, at least m horizontal scanning periods are included in one frame period. Since one frame period is configured by sequentially selecting the first scanning lines 421 or the second scanning lines 422 from the first scanning line 1G1 or the second scanning line 2G1 of the first row in order up to first scanning line 1Gm or the second scanning line 2Gm of the m-th row (alternatively, from the first scanning line 1Gm or the second scanning line 2Gm of the m-th row in order up to the first scanning line 1G1 or the second scanning line 2G1 of the first row), the frame period is also referred to as an orthogonal scanning period.

Figure 4:
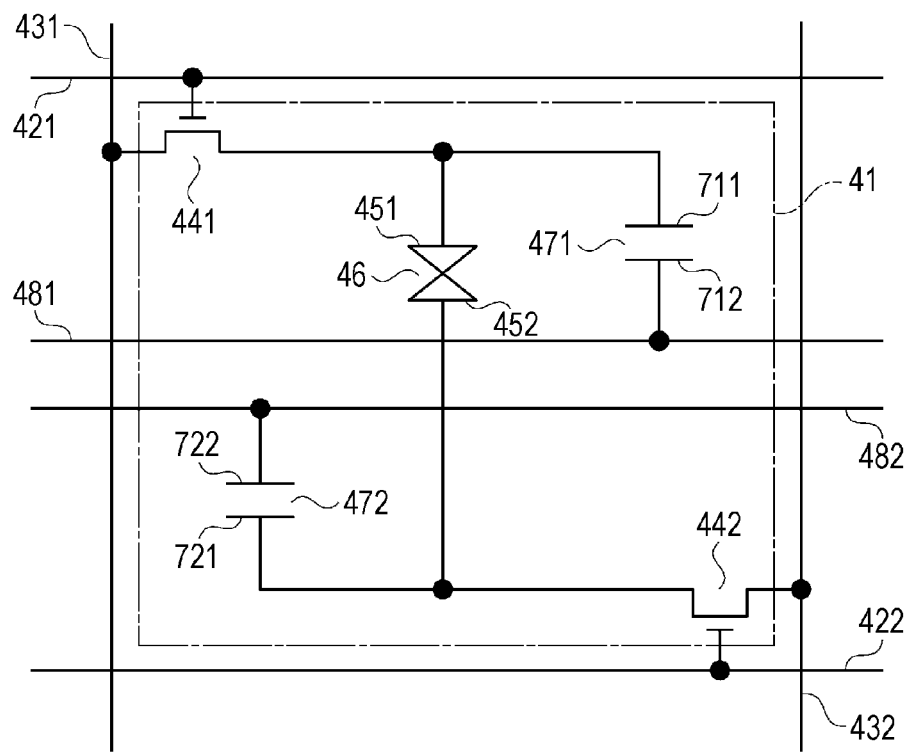
FIG. 4 is a circuit diagram of a pixel.
Figure 5:
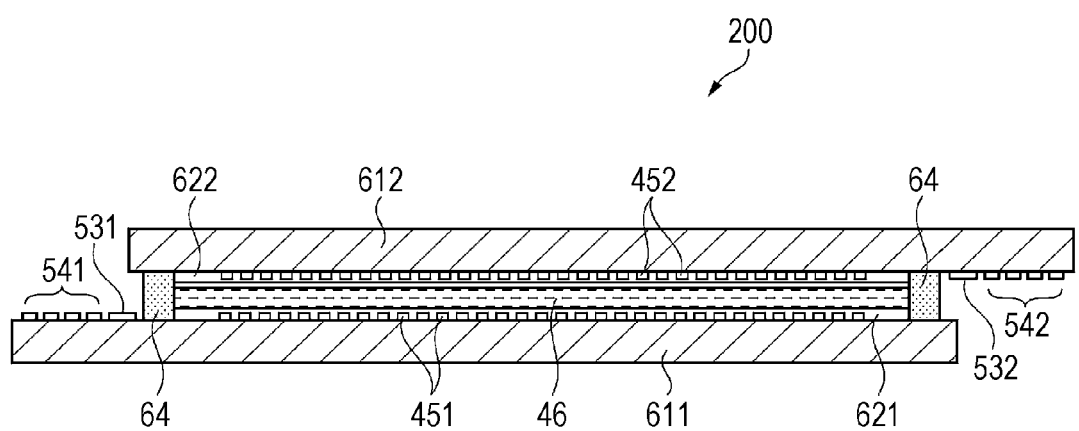
FIG. 5 is a schematic cross-sectional diagram of a liquid crystal apparatus.

The electro-optical apparatus 200 is formed using the first substrate 611 (refer to FIG. 5) and the second substrate 612 (refer to FIG. 5). The first scanning lines 421, the first signal lines 431, a first transistor 441 (refer to FIG. 4), and the first pixel electrode 451 are formed on the first substrate 611 and the second scanning lines 422, the second signal lines 432, a second transistor 442 (refer to FIG. 4), and the second pixel electrode 452 are formed on the second substrate 612. Accordingly, the first scanning line driving circuit 521 and the first signal line driving circuit 531 of the driving circuit 51 are formed on the first substrate 611 using a thin film element such as a thin film transistor. On the other hand, the second scanning line driving circuit 522 and the second signal line driving circuit 532 of the driving circuit 51 are formed on the second substrate 612 using a thin film element such as a thin film transistor.

The display signal supply circuit 32 and the storage circuit 33 are included in the control apparatus 30 and the control apparatus 30 is configured by a semiconductor integrated circuit which is formed on a monocrystal semiconductor substrate. A first mounting region 541 (refer to FIG. 5) is provided on the first substrate 611 and the display signal from the control apparatus 30 is supplied to the first scanning line driving circuit 521 and the first signal line driving circuit 531 of the driving circuit 51 via a mounting terminal and a flexible printed circuit 1S (FPC) which are arranged on the first mounting region 541. In the same manner, a second mounting region 542 (refer to FIG. 5) is provided on the second substrate 612 and the display signal from the control apparatus 30 is supplied to the second scanning line driving circuit 522 and the second signal line driving circuit 532 of the driving circuit 51 via a mounting terminal and the flexible printed circuit which are arranged on the second mounting region 542. Here, the driving circuit 51 may be configured by a semiconductor integrated circuit which is formed on a monocrystal semiconductor substrate.

Configuration of Pixels

FIG. 4 is a circuit diagram of each of the pixels. Next, description will be given of the configuration of pixels 41 with reference to FIG. 4.

The electro-optical apparatus 200 of the present embodiment is a liquid crystal apparatus and the electro-optical material is the liquid crystal 46. As shown in FIG. 4, the pixel 41 includes the first transistor 441, the second transistor 442, the electro-optical material (the liquid crystal 46), the first pixel electrode 451, and the second pixel electrode 452. The pixel 41 has a configuration which has the first pixel electrode 451 and the second pixel electrode 452 which are mutually opposed and where the liquid crystal 46 of the electro-optical material is arranged between these two electrodes. As a result, the transmittance of light which passes through the liquid crystal 46 changes according to the electric field which is applied between the first pixel electrode 451 and the second pixel electrode 452. Here, as the electro-optical material, an electrophoretic material may be used instead of the liquid crystal 46. In such a case, the electro-optical apparatus 200 is an electrophoresis apparatus which is used in e-books or the like.

The gate of the first transistor 441 is electrically connected with the first scanning lines 421, one of the source or drain of the first transistor 441 is electrically connected with the first signal lines 431, and the other of the source or drain of the first transistor 441 is electrically connected with the first pixel electrode 451. In other words, the first transistor 441 is interposed between the first pixel electrode 451 and the first signal lines 431 to control the electrical connection (conductive/non-conductive) between the first pixel electrode 451 and the first signal lines 431. In this manner, when the first transistor 441 is in an on state, a potential (a first image signal), which is supplied to the first signal lines 431 is supplied to the first pixel electrode 451. Here, in the present embodiment, the first transistor 441 is configured by an N type thin film transistor and the scanning signal which is supplied to the first scanning lines 421 is a selection signal at the time of a high potential and a non-selection signal at the time of a low potential.

The gate of the second transistor 442 is electrically connected with the second scanning lines 422, one of the source or drain of the second transistor 442 is electrically connected with the second signal lines 432, and the other of the source or drain of the second transistor 442 is electrically connected with the second pixel electrode 452. That is, the second transistor 442 is interposed between the second pixel electrode 452 and the second signal lines 432 to control the electrical connection (conductive/non-conductive) between the second pixel electrode 452 and the second signal lines 432. In this manner, when the second transistor 442 is in an on state, a potential (a second image signal), which is supplied to the second signal lines 432, is supplied to the second pixel electrode 452. Here, in the present embodiment, the second transistor 442 is configured by an N type thin film transistor and the scanning signal which is supplied to the second scanning lines 422 is a selection signal at the time of a high potential and a non-selection signal at the time of a low potential.

A first capacitive element 471 is further formed on the first substrate 611 of the pixel 41, and the first image signal which is supplied in the selection period of the pixel 41 is also maintained in the non-selection period. The first capacitive element 471 includes a first capacitive first electrode 711, a first capacitive second electrode 712, and a dielectric film which is arranged between these electrodes. The first capacitive first electrode 711 is electrically connected with the first pixel electrode 451 and the first capacitive second electrode 712 is electrically connected with a first fixing potential line 481. A first fixing potential is supplied to the first fixing potential line 481 and, in the present embodiment, a negative power potential VSS is supplied.

A second capacitive element 472 is further formed on the second substrate 612 of the pixel 41 and the second image signal which is supplied in the selection period of the pixels 41 is also maintained in the non-selection period. The second capacitive element 472 includes a second capacitive first electrode 721, a second capacitive second electrode 722, and a dielectric film which is arranged between these electrodes. The second capacitive first electrode 721 is electrically connected with the second pixel electrode 452 and the second capacitive second electrode 722 is electrically connected with the second fixing potential line 482. A second fixing potential is supplied to the second fixing potential line 482 and, in the present embodiment, a negative power potential VSS (0 V) is supplied. Here, the first fixing potential and the second fixing potential may be any potential as long as it is a fixing potential.

In this manner, in each of the pixels 41, display is performed according to the first image signal and the second image signal. In this manner, it is possible to easily set an optimum potential which is suited to the display of the electro-optical apparatus 200 for every pixel 41. Accordingly, a high quality image with excellent uniformity is displayed in the display region 40 and it is possible to realize both lower voltage and improved durability, both lower voltage and region scanning, or the like.

Here, in the present specification, that a terminal 1 and a terminal 2 are electrically connected has the meaning that the terminal 1 and the terminal 2 are able to enter the same logic state (the potential in terms of the design concept). Specifically, in addition to a case where the terminal 1 and the terminal 2 are directly connected by wiring, a case where the connection is made via a resistance element, a switching element, or the like is included. That is, even though the potential in the terminal 1 and the potential in the terminal 2 are slightly different, the terminal 1 and the terminal 2 are electrically connected in a case where both have the same logic on the circuit. Accordingly, for example, as shown in FIG. 4, even in a case where the first transistor 441 is arranged between the first signal line 431 and the first pixel electrode 451, since the first image signal which is supplied to the first signal lines 431 is supplied to the first pixel electrode 451 in a state where the first transistor 441 is on, the first signal lines 431 and the first pixel electrode 451 are electrically connected.

Structure of Liquid Crystal Apparatus

FIG. 5 is a schematic cross-sectional diagram of a liquid crystal apparatus. Description will be given below of the cross-sectional structure of the liquid crystal apparatus with reference to FIG. 5. Here, in the following form, cases where the wording is "on XXX" represents cases of being arranged so as to contact the top of XXX, cases of being arranged via another constituent component on the top of XXX, or cases where a section, which is arranged such that a section contacts the top of XXX, is arranged via another constituent component.

In the electro-optical apparatus 200 (liquid crystal apparatus), the first substrate 611 and the second substrate 612 which configure the pair of substrates are bonded with a sealing material 64 which is arranged in a substantially rectangular frame shape in a plan view. The liquid crystal apparatus has a configuration where the liquid crystal 46 is sealed in a region which is surrounded by the sealing material 64. As the liquid crystal 46, for example, a liquid crystal material which has positive dielectric anisotropy is used.

As shown in FIG. 5, a plurality of first pixel electrodes 451 are formed on the liquid crystal 46 side of the first substrate 611, and a first alignment film 621 is formed so as to cover these first pixel electrodes 451. The first pixel electrodes 451 are a conductive film formed of a transparent conductive material such as indium tin oxide (ITO). On the other hand, a plurality of second pixel electrodes 452 are formed on the liquid crystal 46 side of the second substrate 612, and a second alignment film 622 is formed so as to cover these second pixel electrodes 452. The second pixel electrodes 452 are conductive films formed of a transparent conductive material such as ITO.

The liquid crystal apparatus is a transparent type, and polarization plates (which are not shown in the diagram) or the like are respectively arranged and used on the incidence side and the emission side of the light in the first substrate 611 and the second substrate 612. Here, the configuration of the liquid crystal apparatus is not limited thereto and may be a configuration of a reflective type or a semi-transmissive type.

The electro-optical apparatus 200 is provided with the first substrate 611 and the second substrate 612. A section of the driving circuit 51 (the first signal line driving circuit 531 is illustrated in FIG. 5) and the first mounting region 541 are formed on the first substrate 611 and a section of the driving circuit 51 (the second signal line driving circuit 532 is illustrated in FIG. 5) and the second mounting region 542 are formed on the second substrate 612. A display signal from the control apparatus 30 is supplied to the first scanning line driving circuit 521, the first signal line driving circuit 531, the second scanning line driving circuit 522, the second signal line driving circuit 532, and the like via the first mounting region 541 or the second mounting region 542.

Here, the first pixel electrode 451 and the second pixel electrode 452 are aligned; however, this has the meaning that the position and the size of the opening section of the first pixel electrode 451 are equal to the position and size of the opening section of the second pixel electrode 452 in terms of the design concept. A first light shielding film may be formed so as to surround the periphery of the first pixel electrode 451 in the pixel 41, and a common portion of the region other than the first light shielding film and the first pixel electrode 451 in a plan view is the opening section of the first pixel electrode 451. In the same manner, a second light shielding film may be formed so as to surround the periphery of the second pixel electrode 452 in the pixel 41, and a common portion of the region other than the second light shielding film and the second pixel electrode 452 in a plan view is the opening section of the second pixel electrode 452. Even if the position and size of the opening section of the first pixel electrode 451 deviate from the position and size of the opening section of the second pixel electrode 452 due to manufacturing error or the like, it is possible to say that the first pixel electrode 451 and the second pixel electrode 452 are aligned.

Driving Method

Figure 6:
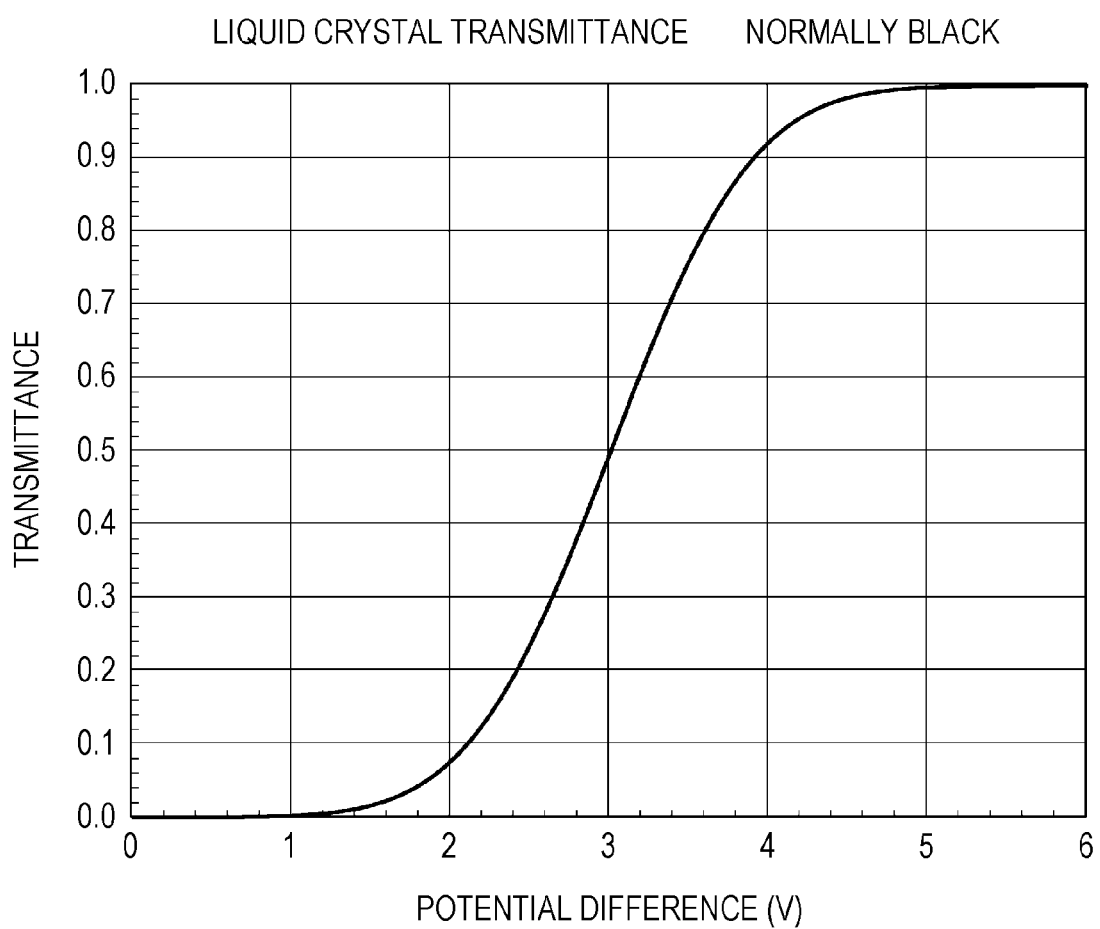
FIG. 6 is a diagram which shows an example of electro-optical characteristics of an electro-optical material.

FIG. 6 is a diagram which shows an example of electro-optical characteristics of the electro-optical material. Next, description will be given of the driving method of the electro-optical apparatus 200 with reference to FIG. 6.

In the electro-optical apparatus 200, the first period and the second period are alternately repeated and polarity inversion driving is performed. As a result, the durability of the electro-optical material is improved. The first period and the second period may be repeated for every frame period or may be repeated every several frame periods. In addition, one entire frame may be set to the same polarity (frame inversion driving), or the polarity may be inverted for every row of pixels 41 (1H inversion driving). Furthermore, with 1H inversion driving, dot inversion driving which inverts the polarity in the pixels 41 which are adjacent in the row direction may be carried out. In the present embodiment, dot inversion driving where the first period and the second period are repeated for every horizontal scanning period is described as an example.

In the first period (for example, a period where the pixels 41 of odd numbered rows are selected), the driving section 50 supplies a potential (an image potential) which corresponds to the display luminance to the first pixel electrode 451 as the first image signal and supplies a reference potential with a lower potential than the image potential to the second pixel electrode 452 as the second image signal. Furthermore, in a second period following the first period, the driving section 50 sets the first image signal as the reference potential and the second image signal as the image potential. In this manner, it is possible to invert the polarity to the electro-optical material in the first period and the second period while comparatively lowering the driving potentials such as the image potential, and it is possible to realize polarity inversion driving at a low voltage. Here, in the present embodiment, a case where the first image signal is the image potential and the second image signal is the reference potential is set as a positive polarity (an electric field which is applied to the electro-optical material is directed from the first pixel electrode 451 toward the second pixel electrode 452) and a case where the first image signal is the reference potential and the second image signal is the image potential is set as a negative polarity (an electric field which is applied to the electro-optical material is directed from the second pixel electrode 452 toward the first pixel electrode 451).

The image potential is a potential which is determined according to the electrical characteristics of the electro-optical material with respect to the reference potential and a signal which is determined from the specific potential difference of the electro-optical material, the cell gap (the distance between the first pixel electrode 451 and the second pixel electrode 452), and the display gradation. For example, in the electro-optical material which has the electro-optical characteristics (the liquid crystal 46) which are depicted in FIG. 6, the sum of the potential difference according to the display gradation thereof (the value of the horizontal axis of the electro-optical characteristics in FIG. 6) and the reference potential is the image potential. For example, if the reference potential is set as 1 V, in the example of FIG. 6, since the potential difference of a black display (0% transmittance) is approximately 1 V, and the image potential of the black display (0% transmittance) is approximately 2 V. In the same manner, the image potential of a blackish gray display (25% transmittance) is approximately 3.5 V which is the sum of a 2.5 V potential difference and the reference potential, the image potential of a whitish gray display (75% transmittance) is approximately 4.5 V which is the sum of a 3.5 V potential difference and the reference potential, and the image potential of a white display (100% transmittance) is approximately 6 V which is the sum of an approximately 5 V potential difference and the reference potential.

The reference potential is a potential which is a reference for the image potential and a value obtained by subtracting the reference potential from the image potential is a potential difference (the horizontal axis of the electro-optical characteristics as shown in FIG. 6) which corresponds to the luminance which is to be displayed. The reference potential is a potential which is suitable for every one of the pixels 41 (a pixel reference potential) and the storage circuit stores the pixel reference potentials.

After intensive research, the present inventors found that the cell gap in the electro-optical apparatus 200 is different for every location in the strict sense, and that the electro-optical material includes ions as impurities. The planar distribution of the impurity ions is not always uniform in the display region 40. It was found that, as a result of the non-uniformity of the cell gaps or the ion distribution in the display region 40, the electro-optical characteristics for every one of the pixels 41 are slightly different in the strict sense. It was found that, since the reference potential is set in common with respect to all of the pixels 41 as a common potential in the related art, these non-uniformities produce non-uniformity in the display image.

Therefore, the optimum reference potential (the pixel reference potential) is measured for every one of the pixels 41 of the electro-optical apparatus 200 and these are stored in advance in the storage circuit of the driving section 50 of the electro-optical apparatus 200. Then, when the driving section 50 displays an image in one of the pixels 41, the image potential is supplied to one of the first image signal and the second image signal and the pixel reference potential which corresponds to the one pixel 41 is read out from the storage circuit and the pixel reference potential which is read out for the one pixel 41 is supplied to the other. Since the optimum pixel reference potential is set as the reference potential for every one of the pixels 41, it is possible to easily realize the electro-optical apparatus 200 which displays a high quality image with excellent uniformity in the display region 40. An example is shown below.

EXAMPLE

In the first period (a first frame period), the pixel 41 of row 1 and column 1 has a black display with a positive polarity (0% transmittance), the pixel 41 of row 1 and column 2 has a blackish gray display with a negative polarity (25% transmittance), the pixel 41 of row 2 and column 1 has a whitish gray display with a negative polarity (75% transmittance), and the pixel 41 of row 2 and column 2 has a white display with a positive polarity (100% transmittance). In addition, the non-uniformity in the display region 40 is set to +0.05 V in the pixel 41 of row 1 column 1, +0.02 V in the pixel 41 of row 1 column 2, −0.03 V in the pixel 41 of row 2 column 1, and −0.04 V in the pixel 41 of row 2 column 2.

Since the pixel reference potential takes into account non-uniformity with respect to the reference potential as a whole (the average value of the pixel reference potential with respect to all of the pixels 41 is 1 V in the current example), in this case, the pixel reference potential is set to +1.05 V in the pixel 41 of row 1 column 1, the pixel reference potential is set to +1.02 V in the pixel 41 of row 1 column 2, the pixel reference potential is set to +0.97 V in the pixel 41 of row 2 column 1, and the pixel reference potential is set to +0.96 V in the pixel 41 of row 2 column 2. A non-volatile storage circuit stores these values for every one of the pixels 41 and these values are supplied to each of the pixels 41 as the first image signal and the second image signal in the first period (the first frame period).

The non-volatile storage circuit also stores the image potential in the luminance which is to be displayed such as the image potential of a black display (0% transmittance) as 2 V, the image potential of a blackish gray display (25% transmittance) as 3.5 V, the image potential of a whitish gray display (75% transmittance) as 4.5 V, and the image potential of a white display (100% transmittance) as 6 V, and these are supplied to each of the pixels 41 as the first image signal and the second image signal in the first period (the first frame period).

As a result, in the pixel 41 of row 1 column 1, the first image signal is a 2 V image potential and the second image signal is a 1.05 V pixel reference potential, and the potential difference between the first pixel electrode 451 and the second pixel electrode 452 is a positive polarity which is the optimum 0.95 V in the black display of the pixel 41 of row 1 column 1. In addition, in the pixel 41 of row 1 column 2, the first image signal is a +1.02 V pixel reference potential and the second image signal is a 3.5 V image potential, and the potential difference between the first pixel electrode 451 and the second pixel electrode 452 is a negative polarity which is the optimum −2.48 V in the blackish gray display of the pixel 41 of row 1 column 2. In addition, in the pixel 41 of row 2 column 1, the first image signal is a +0.97 V pixel reference potential and the second image signal is a 4.5 V image potential, and the potential difference between the first pixel electrode 451 and the second pixel electrode 452 is a negative polarity which is the optimum −3.53 V in the whitish gray display of the pixel 41 of row 2 column 1. In addition, in the pixel 41 of row 2 column 2, the first image signal is a 6 V image potential and the second image signal is a 0.96 V pixel reference potential, and the potential difference between the first pixel electrode 451 and the second pixel electrode 452 is a positive polarity which is the optimum 5.04 V in the white display of the pixel 41 of row 2 column 2.

Next, in the second period (the second frame period), the pixel 41 of row 1 and column 1 have a black display with a negative polarity (0% transmittance), the pixel 41 of row 1 and column 2 have a blackish gray display with a positive polarity (25% transmittance), the pixel 41 of row 2 and column 1 have a whitish gray display with a positive polarity (75% transmittance), and the pixel 41 of row 2 and column 2 have a white display with a negative polarity (100% transmittance). In such a case, the driving section 50 supplies a 1.05 V pixel reference potential as the first image signal and supplies a 2 V image potential as the second image signal to the pixel 41 of row 1 column 1. As a result, the potential difference between the first pixel electrode 451 and the second pixel electrode 452 is a negative polarity of an optimum −0.95 V in the black display of the pixel 41 of row 1 column 1. In addition, the driving section 50 supplies a 3.5 V image potential as the first image signal and supplies a +1.02 V pixel reference potential as the second image signal to the pixel 41 of row 1 column 2. As a result, the potential difference between the first pixel electrode 451 and the second pixel electrode 452 is a positive polarity of an optimum +2.48 V in the blackish gray display of the pixel 41 of row 1 column 2. In addition, the driving section 50 supplies a 4.5 V image potential as the first image signal and supplies a +0.97 V pixel reference potential as the second image signal to the pixel 41 of row 2 column 1. As a result, the potential difference between the first pixel electrode 451 and the second pixel electrode 452 is a positive polarity of an optimum +3.53 V in the whitish gray display of the pixel 41 of row 2 column 1.

In addition, the driving section 50 supplies a 0.96 V pixel reference potential as the first image signal and supplies a 6 V image potential as the second image signal to the pixel 41 of row 2 column 2. As a result, the potential difference between the first pixel electrode 451 and the second pixel electrode 452 is a negative polarity of an optimum −5.04 V in the black display of the pixel 41 of row 2 column 2. In this manner, it is possible to apply an optimum potential difference to the liquid crystal for every one of the pixels 41 in the electro-optical apparatus 200 and it is possible to lower the driving voltage by the sum (approximately 6 V in the present example) of the highest potential difference (approximately 5 V in the example in FIG. 6) which is used in the display and the reference potential (approximately 1 V in the present example), that is, approximately the image potential, and polarity inversion driving is possible.

COMPARATIVE EXAMPLE

Description will be given of an example where the same image is displayed by the same dot inversion driving as the Example described above in the technique of the related art. In the technique of the related art, the pixel potential is supplied to the pixel electrodes of each of the pixels 41 of the element substrate as the image signal and a common electrode is provided on the counter substrate.

The potential of the common electrode is fixed at 7 V. When the pixel 41 of row 1 column 1 are set to a black display with a positive polarity in the first period (the first frame period), the driving section 50 performs a calculation which subtracts +0.05 V of the non-uniformity of the pixel 41 of row 1 column 1 from 1 V of the potential difference which is equivalent to a black display, performs a calculation which adds this 0.95 V to a common potential, and supplies 7.95 V to the pixel electrodes of row 1 column 1 as the image signal. The difference of the pixel potential with respect to the potential of the common electrode (the common potential, 7 V in the present example) is 0.95 V and has a positive polarity. When the pixel 41 of row 1 column 2 are set to a blackish gray display with a negative polarity in the first period (the first frame period), the driving section 50 performs a calculation which subtracts +0.02 V of the non-uniformity of the pixel 41 of row 1 column 2 from 2.5 V of the potential difference which is equivalent to a blackish gray display, performs a calculation which subtracts this 2.48 V from the common potential, and supplies 4.52 V to the pixel electrodes of row 1 column 2 as the image signal. The difference of the pixel potential with respect to the potential of the common electrode is −2.48 V and has a negative polarity. When the pixel 41 of row 2 column 1 are set to a whitish gray display with a negative polarity in the first period (the first frame period), the driving section 50 performs a calculation which subtracts −0.03 V of the non-uniformity of the pixel 41 of row 2 column 1 from 3.5 V of the potential difference which is equivalent to the whitish gray display, performs a calculation which subtracts this 3.53 V from the common potential, and supplies 3.47 V to the pixel electrodes of row 2 column 1 as the image signal. The difference of the pixel potential with respect to the potential of the common electrode is −3.53 V and has a negative polarity. When the pixel 41 of row 2 column 2 are set to a white display with a positive polarity in the first period (the first frame period), the driving section 50 performs a calculation which subtracts −0.04 V of the non-uniformity of the pixel 41 of row 2 column 2 from 5 V of the potential difference which is equivalent to the white display, performs a calculation which adds this 5.04 V to the common potential, and supplies 12.04 V to the pixel electrodes of row 2 column 2 as the image signal. The difference of the pixel potential with respect to the potential of the common electrode (the common potential, 7 V in the present example) is 5.04 V and has a positive polarity.

In this manner, in the related art technique, when performing polarity inversion driving by applying the optimum potential difference for every one of the pixels 41 to the liquid crystal, a calculation is performed which corrects the non-uniformity to a potential difference which is equivalent to the display for every one of the pixels 41 in each of the frames, and, with respect thereto, a large calculation operation is necessary to perform the addition or subtraction which determines the polarity. In addition, the driving voltage is also double or more the highest potential difference (approximately 5 V in the example in FIG. 6) used in the display. In other words, in the electro-optical apparatus 200 shown in the present embodiment (Example), it is possible to easily perform optimum driving for every one of the pixels 41 without performing a large calculation process at a driving voltage which is approximately half that of the related art. As a result, it is possible to easily realize the electro-optical apparatus 200 which displays high quality images with excellent uniformity and which is excellent in durability with a low power consumption, or the electro-optical apparatus 200 which displays high quality images with excellent uniformity and in which region scanning is possible with a low power consumption.

Other Electronic Equipment

The electro-optical apparatus 200 has the configuration described above; however, examples of electronic equipment into which the electro-optical apparatus 200 is assembled include, in addition to the projector described with reference to FIG. 1, a rear projection TV, a direct-view TV, a mobile phone, portable audio equipment, a personal computer, a monitor of a video camera, a car navigation system, a pager, an electronic organizer, a calculator, a word processor, a workstation, a TV phone, a POS terminal, a digital still camera, and the like. Such electronic equipment is provided with the electro-optical apparatus 200 which displays high quality images with excellent uniformity and which is excellent in durability with a low power consumption, or the electro-optical apparatus 200 which displays high quality images with excellent uniformity and in which region scanning is possible with a low power consumption.

The invention is not limited to the embodiments described above and it is possible to add various types of changes, modifications, or the like in the embodiments described above. Modification Examples are described below.

MODIFICATION EXAMPLE 1

Fixed Image Signal Form

Next, description will be given of the electro-optical apparatus 200 according to Modification Example 1. Here, the same reference numerals are given to the same constituent components as Embodiment 1 and overlapping description thereof will be omitted.

In the electro-optical apparatus 200 of the present Modification Example, the driving method is different. In other respects, the present Modification Example is substantially the same as Embodiment 1. Embodiment 1 adopts a driving method where the first period and the second period are repeated, the first image signal is the image potential and the second image signal is the reference potential in the first period, and the first image signal is the reference potential and the second image signal is the image potential in the second period. The driving method is not limited thereto and is able to take various forms. For example, the first image signal may be set to always be the image potential and the second image signal may be set to be the reference potential. That is, the first image signal may be set to the image potential and the second image signal may be set to the reference potential in the first period and in the second period. In such a case, the image potential is different in the first period and in the second period. When the first period is set to be a positive polarity period, the first image signal in the first period (the image potential in the first period) is higher than the reference potential in the first period, and when the second period is set to be a negative polarity period, the first image signal in the second period (the image potential in the second period) is lower than the reference potential. In this manner, the reference potential may be an intermediate potential between the image potential in the first period and the image potential in the second period.

In this manner, it is possible to narrow the voltage adjustment range of the second image signal (reference potential) and it is possible to simplify the internal configuration of the control apparatus 30. In particular, it is possible to simplify the configuration of a digital-analog conversion circuit (Digital to Analog Converter) which is included in the control apparatus 30.

What is claimed is:

1. An electro-optical apparatus comprising:
a pixel where first scanning line, first signal line, second scanning line, and second signal line are wired;
a first substrate; and
a second substrate,
wherein the pixel includes a first transistor, a second transistor, a first pixel electrode, a second pixel electrode, and an electro-optical material,
the electro-optical material is interposed between the first pixel electrode and the second pixel electrode,
a gate of the first transistor is electrically connected with the first scanning line, one of a source or a drain of the first transistor is electrically connected with the first signal line, and the other of the source or drain of the first transistor is electrically connected with the first pixel electrode,
a gate of the second transistor is electrically connected with the second scanning line, one of a source or a drain of the second transistor is electrically connected with the second signal line, and the other of the source or drain of the second transistor is electrically connected with the second pixel electrode,
the first scanning line, the first signal line, the first transistor, and the first pixel electrode are formed on the first substrate, and
the second scanning line, the second signal line, the second transistor, and the second pixel electrode are formed on the second substrate.

2. The electro-optical apparatus according to claim 1, further comprising:
a driving section,
wherein the driving section supplies a first image signal to the first pixel electrode and supplies a second image signal to the second pixel electrode.

3. The electro-optical apparatus according to claim 2,
wherein, in a first period, the first image signal has a image potential which corresponds to a display luminance and the second image signal has a reference potential which is a lower potential than the image potential, and
in a second period following the first period, the first image signal has the reference potential and the second image signal has the image potential.

4. The electro-optical apparatus according to claim 3,
wherein the first period and the second period are alternately repeated.

5. The electro-optical apparatus according to claim 3,
wherein the driving section includes a storage circuit,
the reference potential is a pixel reference potential which is suitable for every pixel,
the storage circuit stores the pixel reference potential, and
when providing the reference potential to one pixel, the driving section supplies the pixel reference potential which corresponds to the one pixel by reading out the pixel reference potential from the storage circuit.

6. Electronic equipment comprising:
the electro-optical apparatus according to claim 1.

7. Electronic equipment comprising:
the electro-optical apparatus according to claim 3.

* * * * *